US010252702B2

(12) United States Patent
Jarasson et al.

(10) Patent No.: US 10,252,702 B2
(45) Date of Patent: Apr. 9, 2019

(54) FLAT-BLADE WINDSCREEN WIPER BLADE COMPRISING AN AERODYNAMIC DEFLECTOR

(71) Applicant: Valeo Systèmes d'Essuyage, Le Mesnil Saint Denis (FR)

(72) Inventors: Jean-Michel Jarasson, Le Mesnil Saint Denis (FR); Sébastien Jallet, Maurepas (FR); Flavien Dubief, Montigny-le-Bretonneux (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 587 days.

(21) Appl. No.: 14/521,574

(22) Filed: Oct. 23, 2014

(65) Prior Publication Data
US 2015/0040338 A1 Feb. 12, 2015

Related U.S. Application Data

(63) Continuation of application No. 11/547,823, filed as application No. PCT/EP2005/003507 on Apr. 4, 2005.

(30) Foreign Application Priority Data

Apr. 7, 2004 (FR) ...................................... 04 03619

(51) Int. Cl.
*B60S 1/38* (2006.01)
(52) U.S. Cl.
CPC ............. *B60S 1/3881* (2013.01); *B60S 1/381* (2013.01); *B60S 1/3848* (2013.01); *B60S 2001/382* (2013.01)

(58) Field of Classification Search
CPC ...... B60S 1/3881; B60S 1/381; B60S 1/3882; B60S 1/3874; B60S 1/3875; B60S 1/3877; B60S 1/3879
(Continued)

(56) References Cited

U.S. PATENT DOCUMENTS 3,178,753 A 4/1965 Wise
3,418,679 A 12/1968 Barth et al.
(Continued)

FOREIGN PATENT DOCUMENTS

DE 1205856 B 11/1965
DE 19801058 A1 * 7/1999 ................ B60S 1/38
(Continued)

OTHER PUBLICATIONS

DE10120467A1 (machine translation), 2002.*
(Continued)

*Primary Examiner* — Andrew A Horton
(74) *Attorney, Agent, or Firm* — Osha Liang LLP

(57) ABSTRACT

The invention provides a blade (10) comprising a central rigidifying element (20), a wiping strip (14) and an element (16) forming an aerodynamic deflector that has a contour (AE-FM-MA) with an overall triangular shape comprising a front side (AE) that delimits the side of the aerodynamic deflector (16) that faces the wind, characterized in that the ratio (H/L) of the total height (H) of the windscreen wiper blade (10) to the overall transversal width (L) of the windscreen wiper blade (10), is comprised between 1.5 and 2.

19 Claims, 2 Drawing Sheets

(58) Field of Classification Search
USPC .................................... 15/250.201, 250.32
See application file for complete search history.

(56) References Cited

U.S. PATENT DOCUMENTS

| | | | | |
|---|---|---|---|---|
| 3,995,347 | A * | 12/1976 | Kohler | B60S 1/38 15/250.43 |
| 4,976,001 | A * | 12/1990 | Wright | B60S 1/3805 15/250.44 |
| 5,283,925 | A * | 2/1994 | Maubray | B60S 1/3806 15/250.201 |
| 5,946,764 | A | 9/1999 | Tworzydlo | |
| 6,292,974 | B1 | 9/2001 | Merkel et al. | |
| 6,523,218 | B1 * | 2/2003 | Kotlarski | B60S 1/3806 15/250.201 |
| 2002/0000018 | A1 | 1/2002 | Kotlarski et al. | |
| 2002/0133897 | A1 | 9/2002 | De Block et al. | |
| 2003/0014828 | A1 | 1/2003 | Egner-Walter et al. | |
| 2003/0145412 | A1 | 8/2003 | Weiler et al. | |
| 2004/0098821 | A1 | 5/2004 | Kraemer et al. | |
| 2004/0181894 | A1 * | 9/2004 | Lee | B60S 1/38 15/250.201 |
| 2005/0011033 | A1 * | 1/2005 | Thomar | B60S 1/381 15/250.201 |
| 2006/0265830 | A1 * | 11/2006 | Walworth | B60S 1/38 15/236.02 |

FOREIGN PATENT DOCUMENTS

| | | | |
|---|---|---|---|
| DE | 100 00 373 A1 | 8/2001 | |
| DE | 100 34 790 A1 | 2/2002 | |
| DE | 10120467 A1 * | 10/2002 | ............. B60S 1/381 |
| DE | 100 36 115 A1 | 1/2003 | |
| DE | 103 19 346 A1 | 12/2003 | |
| DE | 103 35 393 A1 | 9/2004 | |
| EP | 0477804 A2 | 4/1992 | |
| EP | 1 232 922 A2 | 8/2002 | |
| FR | 2279591 A1 | 2/1976 | |
| FR | 2603850 A1 | 3/1988 | |
| FR | 2851976 A1 | 9/2004 | |
| GB | 2106775 A * | 4/1983 | ............ B60S 1/3806 |
| WO | 01/62561 A1 | 8/2001 | |
| WO | 02/087935 A1 | 11/2002 | |

OTHER PUBLICATIONS

DE19801058A1 (machine translation), 1999.*
Office Action dated Dec. 23, 2014 in related U.S. Appl. No. 11/547,823 (31 pages).
International Search Report for PCT/EP2005/003507 dated Jun. 21, 2005 (3 pages).
Publication Particulars and Abstract in related South African Application No. 990211 dated Jul. 13, 2000 (23 pages).

* cited by examiner

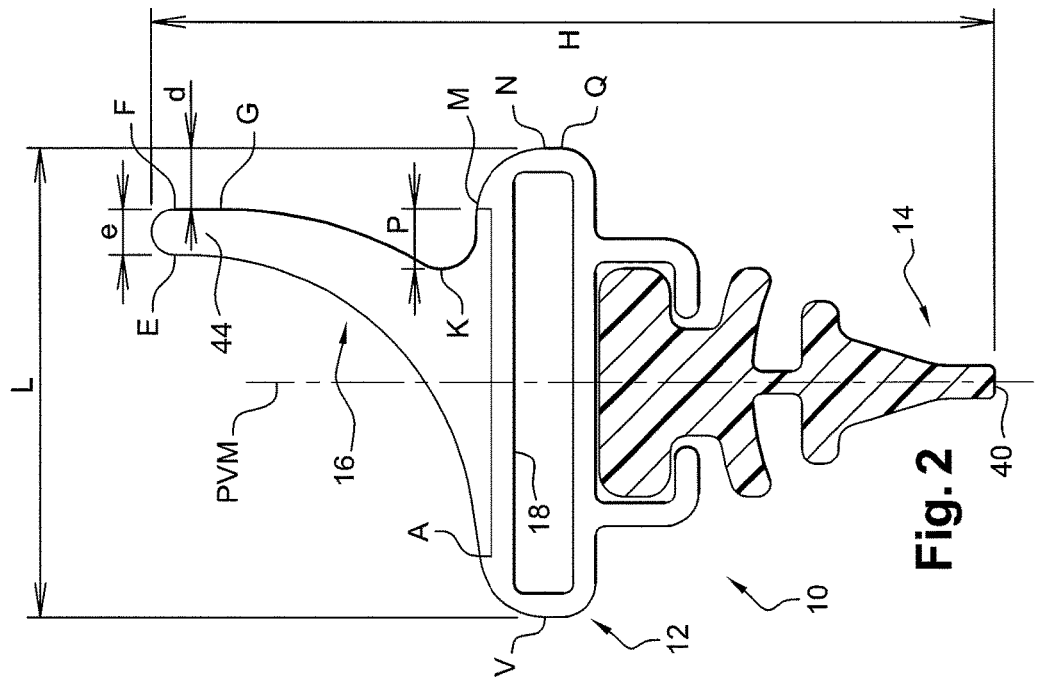
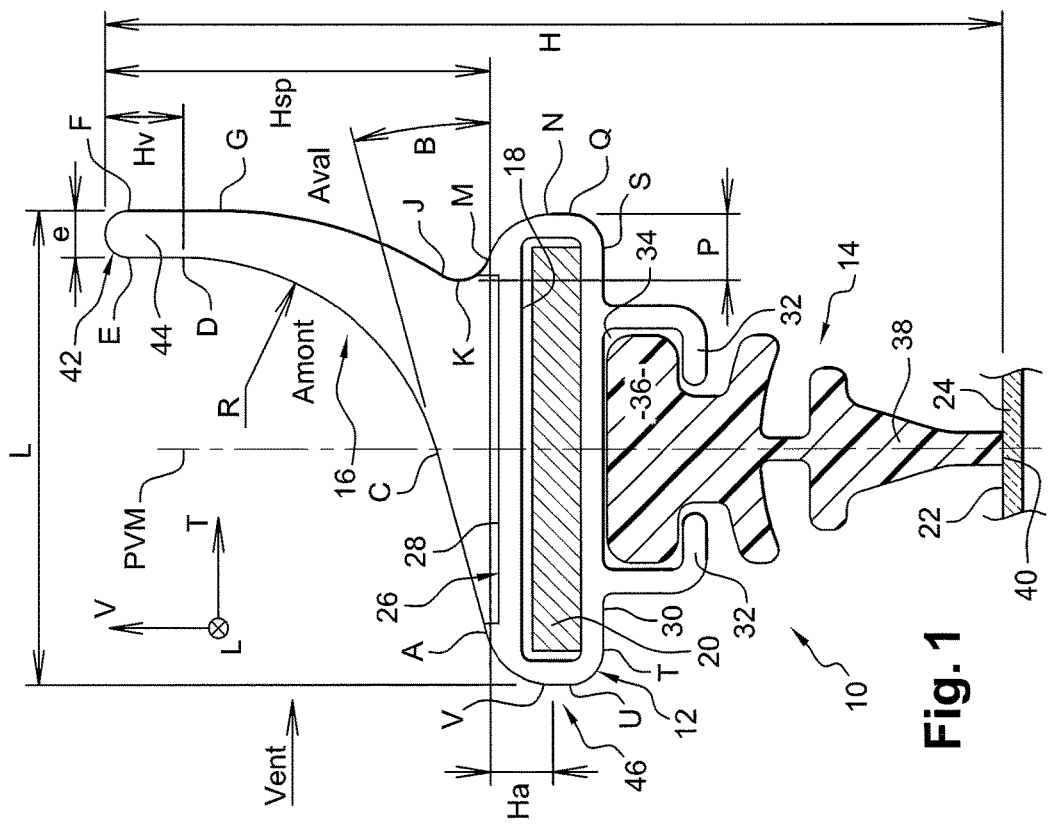

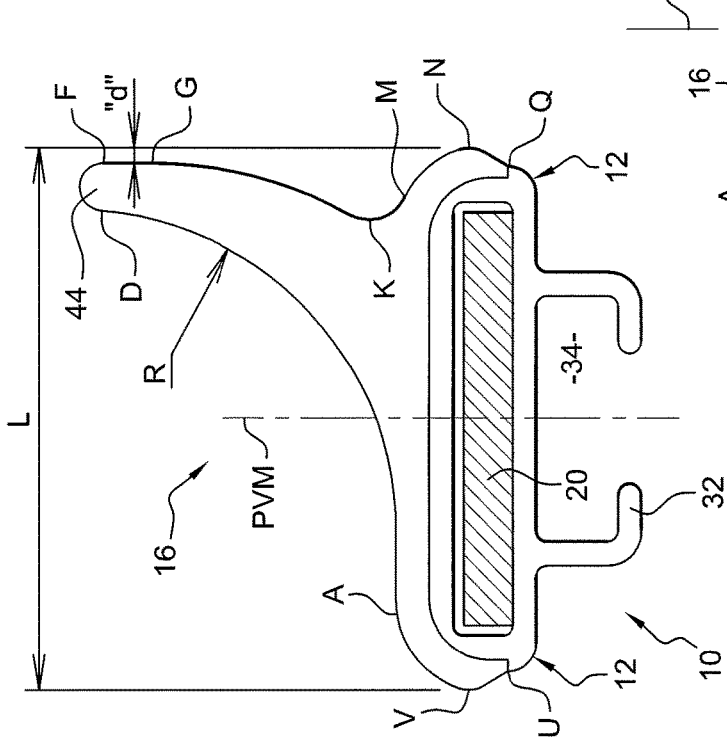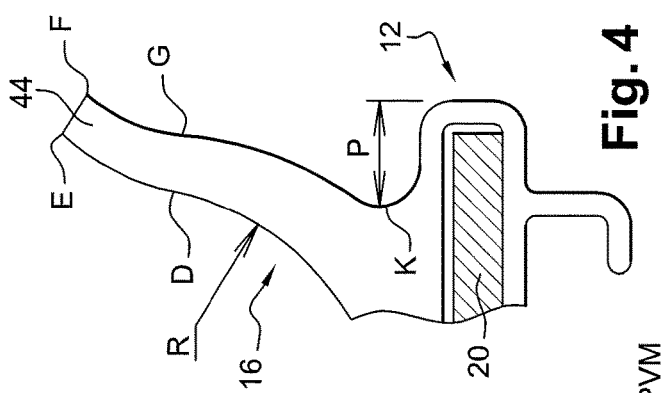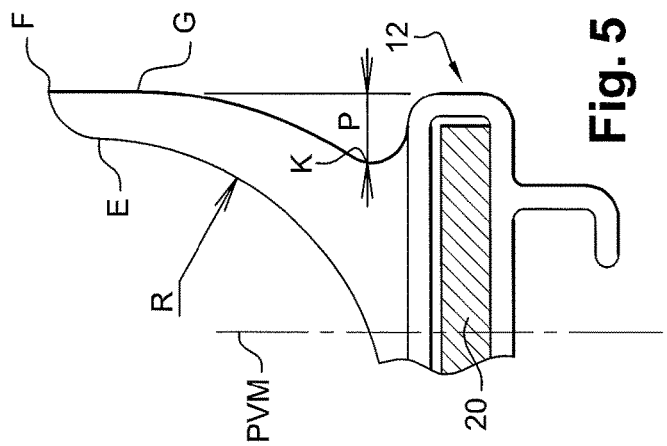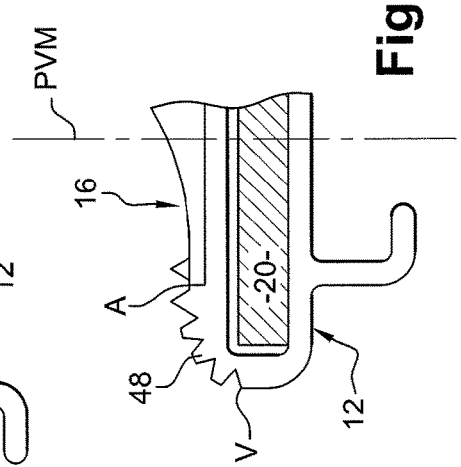

FLAT-BLADE WINDSCREEN WIPER BLADE COMPRISING AN AERODYNAMIC DEFLECTOR

This application is a continuation of U.S. patent application Ser. No. 14/547,823, filed on Oct. 6, 2006, which is herein incorporated by reference in its entirety.

The present invention relates to a flat-blade windscreen wiper blade for a motor vehicle.

The invention relates, in particular to a windscreen wiper blade of a motor vehicle of the type that comprises
- a support frame with a longitudinal main orientation, which comprises bottom means for supporting a wiping strip and a tubular body with a longitudinal main axis, which is delimited by a horizontal bottom wall and by two vertical longitudinal lateral walls;
- a structural element in the shape of a longitudinal horizontal strip, which is accommodated inside the tubular body.

With a view to improving the aerodynamic performance of such a windscreen wiper blade, as proposed in particular in documents U.S. Pat. No. 6,292,974, US-A1-2003/0145412 and US-A-2002/0000018, a known windscreen wiper blade for a motor vehicle exists, of the type that comprises:
- a central longitudinal rigidifying element;
- a strip for wiping the window to be wiped, which extends longitudinally below the central element and which comprises a bottom longitudinal wiping edge that cooperates with the face of the window to be wiped; and
- an element forming an aerodynamic deflector, which extends longitudinally above the central rigidifying element and along at least one section of the latter and which, in a vertical cross-section, has a contour with an overall triangular shape comprising a horizontal base side, a front side that delimits the part of the aerodynamic deflector that faces the wind, and a rear side with an overall vertical orientation, which delimits the side of the deflector that is behind the wind and which is connected to the front side by a section that delimits the top free end top longitudinal edge of the deflector.

In order further to improve the aerodynamic performance of the windscreen wiper blade and its aerodynamic deflector, the invention provides a windscreen wiper blade of the preceding type, characterised in that the H/L ratio of the total height H of the windscreen wiper blade separating the top edge of the aerodynamic deflector from the bottom wiping edge of the wiping strip to the overall transversal width of the windscreen wiper blade, measured on the plane of the rigidifying element, is comprised between 1.5 and 2.

According to other characteristics of the invention:
- the front side of the triangular contour comprises a substantially rectilinear bottom section that forms an acute angle B in relation to the bottom horizontal edge;
- said acute angle B is comprised between 5 and 35 degrees;
- said bottom section extends substantially to the right of a median vertical plane of the central rigidifying element and of the bottom wiping strip;
- said bottom section of the front side of the triangular contour is followed by an intermediate section substantially forming a concave arc of circle;
- the radius R of said intermediate concave section is comprised between 50% and 70% of said total overall width;
- the front side of the triangular contour comprises a top end section;
- said top end section of the front side is substantially rectilinear and has a vertical orientation;
- the top end section of the front side is substantially forming a convex arc of circle;
- said top end section of the front side extends over a marginal vertical height Hv comprised between 15% and ≤25% of the overall height Hsp of the aerodynamic deflector;
- the rear side of the triangular contour comprises a top section that is overall parallel to the top section of the front side;
- the rear side of the triangular contour comprises an intermediate section that is overall parallel to the intermediate section of the front side;
- the top rectilinear section of the rear side extends to the right of the rear lateral edge of the central rigidifying element;
- the rear side of the triangular contour comprises a bottom section forming a concave arc of circle;
- the transversally most internal point of the bottom section forming a concave arc of circle of the rear side is located transversally set back towards the inside in relation to the rear lateral edge of the central rigidifying element;
- the horizontal distance P separating said most internal point of the rear lateral edge from the central support element is comprised between 15% and 25% of said total overall width L;
- the section that delimits the top edge of the aerodynamic deflector is semi-circular in shape;
- the thickness e of the top part of the aerodynamic deflector separating the two vertical and rectilinear top sections is comprised between 8% and 15% of said total overall width L.

Further characteristics and advantages of the invention will become apparent from reading the following detailed description, for the understanding of which the appended figures can be consulted, in which:

FIG. 1 is a diagrammatic large-scale view that shows, in a cross-section across a vertical plane, a section that is characteristic of a first embodiment of a windscreen wiper blade manufactured according to the instructions of the invention;

FIG. 2 is a view similar to that shown in FIG. 1, which illustrates a first alternative embodiment of the general conformation of the aerodynamic deflector;

FIG. 3 is a view similar to that shown in FIG. 1, which illustrates the top part of the windscreen wiper blade with a second alternative embodiment of the general conformation of the aerodynamic deflector;

FIGS. 4 and 5 are two detail views that illustrate two alternative embodiments of the top part of the aerodynamic deflector of the windscreen wiper blade according to the invention;

FIG. 6 is a detail view that illustrates an alternative embodiment of the leading edge.

In the following description and in the claims—by way of non-limiting example and with a view to facilitating their understanding—the terms vertical, horizontal, bottom, top will be adopted in reference to the orientation of the figures and to the trihedron L, V, T shown in FIG. 1, which corresponds to the Longitudinal (main direction of the windscreen wiper blade), Vertical and Transversal (also corresponding to the horizontal reference) directions Identical, similar or analogous elements and components will be referred to using the same reference numbers.

The windscreen wiper blade 10 shown in FIG. 1 consists essentially of a support frame with a longitudinal main orientation, which comprises bottom means for supporting a wiping strip and a tubular body with a longitudinal main axis which is delimited by a top horizontal wall, a bottom horizontal wall and two vertical longitudinal lateral walls.

The central tubular body 12 is, for example, made by moulding from a rigid or semi-rigid plastic material.

The windscreen wiper blade 10 shown in FIG. 1 also consists of a bottom wiping strip 14 made from rubber or a natural or synthetic elastomer, made by extrusion, and of a top aerodynamic deflector or spoiler 16 made from a rigid or flexible synthetic material attached to the central body 12 or made by co-extrusion or co-moulding with this body 12.

The central body 12 has an overall rectangular section, with its long side placed according to the horizontal plane and its short side placed according to the vertical plane. The central body 12 has a general symmetry of design in relation to the median vertical plane PVM, which is also the plane of symmetry of the bottom wiping strip 14.

The hollow central body 12 delimits an internal hollow housing 18 with a rectangular contour which accommodates, with free play in order to allow slight relative movements, in particular in the longitudinal direction, a structural element in the form of a longitudinal horizontal strip, a central longitudinal element 20 with a rectangular section which is a structural element in the form of a longitudinal horizontal strip, or a rigidifying spine which, in association with the hollow body 12, constitutes the structure of the flat-blade windscreen wiper blade 10 and which also affords the windscreen wiper blade its elasticity in the vertical and longitudinal planes, allowing it to adapt to the conformation and, in particular, to the curve of the outside face or top face 22 of the window 24 to be wiped.

The top face of the central body 12 comprises a top housing or recess 26 with a flat horizontal bottom that accommodates the bottom part of the deflector 16.

The central body 12 is extended vertically downwards from its bottom face 30 by sections of two opposing ribs 32 with an L-shaped cross-section forming hooks that delimit a bottom housing 34 with a rectangular section, which accommodates, with free play, the top flat heel 36, with rectangular section, of the bottom wiping strip 14.

The strip 14 is of a generally known design and includes, at the bottom, a bottom wiping blade 38 which ends in a bottom edge 40 for wiping the face 22 of the window 24.

The following is a detailed description of the top part of the windscreen wiper blade 10 which essentially consists of the aerodynamic deflector 16 and, more particularly, of the various shape and profile aspects of its contour in a cross-section across a vertical plane.

This contour is overall triangular with:
- a bottom side or base AM which is rectilinear and horizontal and which extends above the flat base 28 of the central body 12;
- a front side AE, overall curved and concave;
- and a rear side FM with overall vertical orientation, which is connected to the top end E of the front side AE by the top longitudinal edge 42 at the end of the deflector 16.

The top edge 42 in this case has a convex semi-circular section EF whose diameter defines the width or marginal thickness "e" of the thin top part 44 of the aerodynamic deflector 16.

The total height of the windscreen wiper blade is defined as being the vertical distance "H" that separates the tip of the top edge 42 of the deflector 16 from the bottom wiping edge 40 of the bottom wiping blade 38

The front side AE comprises a first bottom section AC that is substantially rectilinear or concavely curved with a very large radius which, in the example shown in FIG. 1, extends from point A to point C, which is located substantially at the level of the plane of symmetry PVM. The straight line AC forms, together with the horizontal plane and, for example, the bottom side AM, an acute angle "B" also called angle of incidence of the deflector 16.

The angle B is positive, that is to say that the section AC is "above" the bottom horizontal side AM.

After the point C at the top end of the first bottom section AC, the front side AE comprises a concavely curved intermediate section CD which in this case, by way of example, is a section forming a concave arc of circle with a constant radius "R".

By way of an alternative, not shown, the concave intermediate section CD can comprise several successive parts with different radii.

Beyond the concave intermediate section CD, the front side AE—which delimits the main front lateral face of the aerodynamic deflector 16, facing the wind—comprises a third top end section DE which, in the example of FIG. 1, is a rectilinear section with a vertical orientation, that is to say, parallel to the vertical plane of symmetry PVM.

Due to the situation of the point C at the level of the plane PVM, the main active part of the aerodynamic deflector 16—made up of the concave intermediate section CD and by the top section or tip DE—is situated overall behind or to the rear of the median vertical plane PVM.

Marginal height "Hv" refers to the vertical distance that separates the lowest point D of the third top section DE from the tip of the top edge 42 of the deflector 16.

The height Hsp of the deflector 16 refers to the vertical distance that separates the bottom side AM from the tip of the top edge 42 of the deflector 16.

The rear side MF comprises a first concavely curved bottom section MJ which in this case, by way of example, is a section substantially forming an arc of circle.

The first concave bottom section MJ comprises an intermediate point K which is the most transversally internal point of this section, that is to say, which is as close as possible to the plane of symmetry PVM.

The point K is therefore situated at a horizontal distance "P" from the rear vertical edge NQ of the central body 12 which in this case is a vertical rectilinear section that is vertically in line with the third top end section GF of the rear side MF, which is a rectilinear vertical section parallel to the section DE of the front side AE. P is therefore the distance separating the point K from the rearmost point of the top rear section FG, that is to say, the most distant point from the plane PVM.

In the example shown in FIG. 1, the length or height of the section GF is greater than the length or height of the section DE.

Between the first bottom section MJ and the third top section GF, the rear side MF comprises a second intermediate section JG which is a convexly curved section, in this case overall forming an arc of circle and substantially parallel to the concave section CD, but with a radius that is slightly greater than the latter and not concentric.

The lowest point M of the rear side MF in this case is connected to the top point N of the rear vertical edge NQ of the central body 12 by a section MN forming a convex arc of circle, in the same way as the bottom point Q is connected to the bottom edge or face 30 of the central body 12 by a section QS forming a convex arc of circle.

The front edge or leading edge 46 of the windscreen wiper blade in this case is the leading edge of the central body 12 which is the edge, or profile surface, that is situated the furthest forward in the fluid flow or relative flow of air to which the windscreen wiper blade 10 is subjected.

The leading edge 46 comprises a front rectilinear vertical section VU, the top point of which is connected to the lowest point A of the front side AE of the aerodynamic deflector 16 by a convexly curved section VA substantially forming an arc of circle, and in which the bottom point U Q is connected to the bottom edge or face 30 of the central body 12 by a section UT forming a convex arc of circle.

The total overall width "L" of the windscreen wiper blade thus corresponds to the horizontal distance separating the front VU and rear NQ external vertical sections or edges of the central body 12.

According to a first aspect of the invention, the ratio of total width L/total height H is such that:

$1.5 \leq H/L \leq 2$.

For example, in FIG. 1, for a total height H of around 20 mm, the total width L is around 10 mm.

According to another aspect of the invention, the angle of incidence B is positive and is preferably such that:

5 degrees $\leq B \leq$ 35 degrees.

For example, in FIG. 1 the angle B is around 15 degrees.

The radius R of the concave intermediate section CD is comprised between 50% and 70% of the total overall width L.

The radius of curvature R of the concave intermediate section CD is thus comprised between 5 mm and 7 mm and the total height Hsp of the aerodynamic deflector 16 is equal to around 7.5 mm.

The smaller the angle B, the smaller the radius R and the more the aerodynamic deflector 16 can be said to be "dipped".

According to yet another aspect of the invention, the marginal thickness e of the aerodynamic deflector 16 is such that:

8% of $L \leq e \leq 15\%$ of L.

The thickness e of the top end part of the aerodynamic deflector 16 is substantially equal to 1 mm.

According to a further aspect of the invention, the marginal height Hv of the aerodynamic deflector 16 is such that:

15% of $Hsp \leq Hv \leq 25\%$ of Hsp.

In this way, still in FIG. 1, the resulting height Hv is approximately 1.5 mm.

According to yet another aspect of the invention, the distance or "dip" P of the rear face behind the wind of the deflector is such that:

20% of $L \leq P \leq 25\%$ of L.

In this way, P is, for example, equal to approximately 2 mm.

As regards the thinness of the leading edge 46, in other words the vertical distance "Ha" that separates the point A from the point V, it is such that:

$Ha \leq \frac{1}{3}$ of L.

Ha is therefore comprised between 0.5 mm and 3 mm.

The added or extruded or moulded deflectors are generally defined by an overall shape or by an average angle of the wing in relation to the plane of the windscreen to be wiped.

The deflectors thus manufactured have limited efficiency or are inefficient, resulting in a loss of performance and therefore of wiping quality and a risk in terms of safety Some of these profiles even generate turbulence that enhances the phenomenon of "water drag-back" or "water pull-back", that is to say that the blade pulls the water it just wiped with it when it returns to its position at the bottom of the windscreen.

The aerodynamic performance of a profile is the combination of several criteria including:
lift;
drag;
the re-attachment point, which defines the distance for re-attachment of the air flows behind or to the rear of the profile.

These different criteria change according to:
the overall dimensions of the profile and in particular the height H/width L ratio;
the geometry of the leading edge, which is the foremost surface of the profile in the flow of the fluid situated below the active face of the aerodynamic deflector that faces the wind;
the actual geometry of the deflector 16 or spoiler and, in particular, its angle of incidence B, its concave curvature R and its marginal height Hv;
the projected lifting surfaces, at the front, at the middle (deflector, tip included) or at the rear of the profile.

The state-of-the-art shows and theoretical two-dimensional simulation confirms that a profile in which H=L in overall terms (in other words H/L=1), with a level of lift performance of xN/m can, according to the instructions of the invention, be easily improved and notably so if H>L is obtained with a ratio comprised between 1.5 and 2.

The higher the H/L ratio, the greater the lift performance, while the drag performance drops, having a considerable "catch in the wind" effect that influences the regularity of the wiping cycle, but also the water drag-back phenomenon.

The principle of the solutions proposed according to the present invention consists of obtaining the best dimensional compromise and therefore an H/L dimensional ratio with a value comprised between 1.5 and 2.

Below this range, average lift performance is obtained with low drag, and above it, considerable lift performance is obtained that can cause the phenomena mentioned above.

By reducing the width L and keeping an initial height H with an H/L ratio equal to 1.5 to 2, the lift performance increases, while the drag and the distance of the re-attachment point remain stable.

The active part of the deflector is shifted towards the rear of the profile such as to increase the performance, as is the dip "P" formed in the rear of the profile, which enables a reduction in the amount of turbulence.

By adapting, on the one hand, certain geometries that are specific to the deflector, in particular the leading edge, the angle of incidence B and the curvature R of the concave surface and the marginal vertical height Hv of the deflector, the channelling and the guiding of the air flows over the surface of the deflector are improved such as to reduce the aerodynamic disturbances and thereby improve the performance of the profile.

The profile and the shape of the leading edge make up the surface of the blade that is the furthest forward in the fluid flow, for an angle of attack equal to zero, that is to say, when the windscreen wiper blade is in its position shown in FIG. 1, in which the plane PVM is orthogonal to the surface 22 to be wiped.

The flow is, in a first approximation, separated into two parts: a bottom part re-circulated at the bottom of the wiping blade 38, and another top part that interacts with the aerodynamic deflector 16 of the wiping blade 10. The role of the leading edge is to suitably guide the flow over the deflector in order to obtain the best push effect.

With a view to preventing any separation of the fluid at the level of the leading edge, the latter must enter the flow in an optimum manner. For various dimensional reasons to do with a maximum width in order to remain within an H/L ratio of between 1.5 and 2, and for reasons relating to the methods of manufacturing and obtaining the part, it is not always possible to obtain a leading edge that is as thin as desired with the proportions mentioned above. For this reason, the separation will be reduced as much as possible by ensuring a small radius for the section VA and "non-angularity", that is to say a lack of square edges, to disturb the air flow as little as possible.

The angle of incidence B corresponds overall to the slope between the end of the leading edge which corresponds to the point A and the start of the concave curvature CE of the deflector 16.

In the context of the dimensional and manufacturing constraints mentioned above, the angle of incidence B allows the flow of air to be guided and to remain in contact with the active surface CD+DE of the aerodynamic deflector 16. The value of this angle B must be comprised between 5 and 35 degrees. Below 5 degrees, the air flow hits the active concave surface of the deflector, creating a whirl and thus a disturbance. Above 35 degrees, the air flow is deflected by the slope of the first section AC and is no longer guided along the active concave surface CD of the aerodynamic deflector 16. Therefore, in extreme slopes, the flow passes "above" the active concave surface, causing an inefficiency of the deflector and therefore poor aerodynamic performance.

The concave curvature CD with a radius R of the aerodynamic deflector 16 makes it possible, the same as the angle of incidence B, to guide the air flow towards the top vertical surface DE of the aerodynamic deflector 16, ideally with no whipstall along the front surface. The advantage of the concave curvature CD is that it "brakes" the air flow at the level of the deflector and thus creates an overpressure. A part of this overpressure is converted into lift, that is to say a pushing force, opposed to the lifting or separation of the blade and the wiping blade, and the other part is converted into drag.

The effect is more predominant than for a substantially rectilinear deflector facing the wind AE, which allows the fluid to slide over this front surface without locally generating an overpressure that is high enough to obtain a pushing effort.

On the contrary, an excessively hollow concave surface CD of the aerodynamic deflector 16 does not provide acceptable performance levels, especially for negative angles of attack, due to the generation of a local low pressure area characterised by a whirl, generated by the stalling of the fluid at the level of the leading edge or along the deflector. Therefore, the shape of the leading edge and the curvature of the deflector must be optimised together for a range of angles of attack of the wiping blade comprised between −10 and +10 degrees.

The relative increase of the marginal height Hv enables an increase in the performance of the deflector, in particular for the negative angles of attack. This also makes it possible to reduce possible influence of the vortex areas that exist at the bottom of the deflector and which can be caused by partial, incomplete optimisation of the leading edge, due to manufacturing and production-related constraints. This also makes it possible to increase, for the negative angles of attack, the surface projected for the overpressure lift (push effect). On the other hand, this also leads to considerably increased drag for angles of incidence equal to zero, which requires this marginal vertical height to be optimised in order to find the best compromise between drag and negative lift.

Indeed, it should be noted that the aerodynamic lift of the profile must be optimum in every position of the windscreen wiper blade in relation to the surface 22 of the windscreen or the window to be wiped. The two-dimensional simulations show that a profile can have good performance levels for an angle of incidence equal to zero, and its performance can be considerably reduced in more extreme positions. The value of the angle of attack of these extreme positions, defined by experimentation, varies between −10 et +10 degrees in relation to the theoretical vertical position on the windscreen, corresponding to the to and fro positions of the windscreen wiper blade when wiping in an alternating sweeping movement.

The geometry of the top tip of the aerodynamic deflector 16 is also dimensioned and positioned with precision since it influences the overall performance of the profile of the aerodynamic deflector 16. Indeed, the smaller the projected surface, the better the performance of the profile when positioned at +10 degrees.

The tip of the deflector must be as thin as possible in order to reduce the projected lift surface, the limit being set by the production constraints. It must also allow the air flow to remain attached and it must direct the latter such as to reduce the size of the recirculation area behind the blade.

The following is a description of several alternatives of embodiment shown in FIG. 2 and following.

The windscreen wiper blade 10 shown in FIG. 2 is overall similar to that of FIG. 1.

The leading edge sections AV and MN are symmetrical in relation to the plane PVM and have a convex profile forming an arc of circle.

The thin top part with vertical orientation 44 of the aerodynamic deflector 16 is overall shifted transversally towards the inside in the direction of the plane PVM. In this way there exists a gap "d", which is the horizontal distance.

The top part of the windscreen wiper blade 10 shown in FIG. 3 is overall similar to that of FIG. 1.

The leading edge sections AV and MN are symmetrical in relation to the plane PVM and have a convex profile forming an arc of circle with a larger radius.

The thin top part with vertical orientation 44 of the aerodynamic deflector 16 is overall shifted transversally towards the inside in the direction of the plane PVM. In this way there exists a gap "d", which is the horizontal distance.

Furthermore, below the horizontal plane that passes through the opposing symmetrical points V and N, in other words, below the leading edge, the front VU and rear NQ sections are no longer vertical, instead they are tilted in the direction of the plane PVM in order to facilitate the division of the air flow into two parts, without any excessive square edges thanks to the transition between the section forming an arc of circle with a large radius AV and the rectilinear section VU.

In the alternative embodiment shown in FIG. 4, when compared with FIG. 1, it can be seen that the third front DE and rear FG top sections are no longer rectilinear and vertical, but rather curved, respectively forming convex and concave arcs of circles.

In this way, the top end point E of the section DE is higher than the top end point F of the section GF with a flat free top "edge" of the thin part 44, that is to say that the section EF is rectilinear.

In the alternative embodiment shown in FIG. 5, when compared with FIG. 1, it can be seen that the third top rear section FG is rectilinear and vertical with its top end point F being the highest point of the deflector 16, while the section EF which corresponds to the top edge of the fine part 44 is a convex quarter circle.

In the alternative embodiment shown in FIG. 6, when compared with FIG. 1, it can be seen that the leading edge AV comprises longitudinal ribs 48. In a section view along the plane of the figure, each rib can have a triangular or substantially square or trapezoidal profile. The height of the ribs, the number of them and their distribution can vary without departing from the context of the invention, as is the case with their profile, which can also be, for example, rounded and convex.

According to further alternative embodiments not shown:
the top edge of the aerodynamic deflector corresponding to the section EF can comprise holes or notches or crimped sections, longitudinally distributed along the trailing edge of the aerodynamic deflector;
the concave section profile CE of the active part of the aerodynamic deflector facing the wind does not necessarily form an arc of circle with a constant radius, but can also comprise several consecutive concave parts with different radii;
in a known manner, it is also possible to provide passages or channels that pass transversally through the bottom part of the aerodynamic deflector, forming venturi tubes that open through to the rear face behind the wind in order to reduce the drag and the water pull-back phenomenon.

The invention claimed is:

1. A windscreen wiper blade comprising:
a monolithic support frame having a tubular body with a main longitudinal axis forming an inner housing, the inner housing having a closed contour viewed in transverse cross-section to the main longitudinal direction, the support frame having a bottom face for supporting a wiping strip for wiping a window;
a pair of longitudinally running ribs extending from the bottom face of the support frame for engaging longitudinally running grooves formed in the wiping strip, the ribs positioned on opposite sides of the wiping strip;
a rigidifying longitudinal element disposed within the inner housing on a face of the inner housing that faces away from the bottom face of the support frame;
the wiping strip extending longitudinally below the bottom face of the support body, the wiping strip including a bottom longitudinal wiping edge that cooperates with the window to be wiped; and
an aerodynamic deflector that extends above the support frame and along at least a portion of the support frame,
wherein the monolithic support frame separates the rigidifying longitudinal element from the wiping strip and prevents the rigidifying longitudinal element from contacting the wiping strip,
wherein the rigidifying longitudinal element is disposed within the inner housing without direct contact with a face of the inner housing that faces the bottom face of the support frame,
wherein a base of the aerodynamic deflector is disposed on a top external surface of the monolithic support frame that faces away from the face of the inner housing that faces the bottom face of the support frame,
wherein a width of the base of the aerodynamic deflector is longer than a distance between the pair of longitudinally running ribs that delimits a portion of the bottom face of the support frame that contacts the wiping strip, and
wherein the aerodynamic deflector is detachably connected to the support frame.

2. The windscreen wiper blade according to claim 1, wherein the inner housing is made of a same material as the tubular body.

3. The windscreen wiper blade according to claim 1, wherein the tubular body consists of a first material, and the aerodynamic deflector consists of a second material different than the first material.

4. The windscreen wiper blade according to claim 1, wherein the tubular body is a rigid plastic material, and the aerodynamic deflector is a flexible synthetic material.

5. The windscreen wiper blade according to claim 1, wherein the rigidifying longitudinal element has at least one smaller dimension than the inner housing.

6. The windscreen wiper blade according to claim 1, wherein the support frame has a rectangular contour limited by an upper horizontal wall, a lower horizontal wall, and two vertical longitudinal side walls.

7. The windscreen wiper blade according to claim 1, wherein the aerodynamic deflector, in a cross-section according to a vertical plane, has a contour with an overall triangular shape comprising a bottom horizontal side forming the base, a front side which delimits a side of the aerodynamic deflector that faces a wind, the front side comprising a bottom section, an intermediate section substantially forming a concave arc of a circle, and a top end section, a rear side with an overall vertical orientation that delimits a side behind the wind of the deflector and which is connected to the front side by a section that delimits a top longitudinal edge with a top free end of the deflector.

8. The windscreen wiper blade according to claim 1, wherein a ratio (H/L) of a total height (H) of the windscreen wiper blade separating a top edge of the aerodynamic deflector from a bottom wiping edge, to an overall transversal width (L) of the windscreen wiper blade, measured on a plane of the rigidifying longitudinal element, is between 1.5 and 2.

9. The windscreen wiper blade according to claim 1, wherein the aerodynamic deflector is co-molded with the support frame.

10. The windscreen wiper blade according to claim 1, wherein the aerodynamic deflector is co-extruded with the support frame.

11. A windscreen wiper blade comprising:
a monolithic support frame having a main longitudinal direction that comprises a tubular body having a main longitudinal axis forming an inner housing, the inner housing having a closed contour viewed in transverse cross-section to the main longitudinal direction, the support frame having a bottom face for supporting a wiping strip;
a rigidifying longitudinal element disposed within the inner housing on a face of the inner housing that faces away from the bottom face of the support frame;
the wiping strip extending longitudinally below the support frame, the wiping strip including a bottom longitudinal wiping edge that cooperates with a window to be wiped; and an aerodynamic deflector that extends above the support frame and along at least a portion of the support frame, the aerodynamic deflector detachably connected to the support frame, wherein the monolithic support frame separates the rigidifying longitudinal element from the wiping strip and prevents the rigidifying longitudinal element from contacting the wiping strip, wherein the rigidifying longitudinal element is disposed within the inner housing without direct contact with a face of the inner housing that faces the bottom face of the support frame, wherein a base of the aerodynamic deflector is disposed on a top external surface of the monolithic support frame that faces away from the face of the inner housing that faces the bottom face of the support frame, and wherein a width of the base of the aerodynamic deflector is longer than a distance between the pair of longitudinally running ribs that delimits a portion of the bottom face of the support frame that contacts the wiping strip.

12. The windscreen wiper blade according to claim 11, wherein a bottom section is substantially rectilinear and forms an acute angle in relation to a bottom horizontal edge.

13. The windscreen wiper blade according to claim 11, wherein a top end section of a front side is substantially rectilinear and has a vertical orientation.

14. The windscreen wiper blade according to claim 11, wherein a rear side of a triangular contour comprises a top section that is overall parallel to a top section of a front side.

15. The windscreen wiper blade according to claim 11, wherein a top rectilinear section of a rear side of the aerodynamic deflector extends at a same level as a median vertical plane of the rigidifying longitudinal element.

16. The windscreen wiper blade according to claim 11, wherein a rear side of a triangular contour comprises a bottom section forming a concave arc of a circle.

17. The windscreen wiper blade according to claim 11, wherein a most transversally internal point of a bottom section forming a concave arc of a circle of a rear side is located transversally set back towards an inside in relation to a rear lateral edge of the rigidifying longitudinal element.

18. The windscreen wiper blade according to claim 11, wherein a section that delimits a top edge of the aerodynamic deflector is semi-circular in shape.

19. A windscreen wiper blade comprising:
a monolithic support frame having a main longitudinal direction that comprises a tubular body having a main longitudinal axis forming an inner housing, the inner housing having a closed contour viewed in transverse cross-section to the main longitudinal direction;
a rigidifying longitudinal element disposed within the inner housing on a face of the inner housing that faces away from the bottom face of the support frame and having at least one smaller dimension than the inner housing;
a wiping strip extending longitudinally below the support frame, the wiping strip including a bottom longitudinal wiping edge that cooperates with a window to be wiped; and
an aerodynamic deflector that extends above the support frame and along at least a portion of the support frame,
wherein the monolithic support frame separates the rigidifying longitudinal element from the wiping strip and prevents the rigidifying longitudinal element from contacting the wiping strip,
wherein the rigidifying longitudinal element is disposed within the inner housing without direct contact with a face of the inner housing that faces the bottom face of the support frame,
wherein a base of the aerodynamic deflector is disposed on a top external surface of the monolithic support frame that faces away from the face of the inner housing that faces the bottom face of the support frame, and
wherein a width of the base of the aerodynamic deflector is longer than a distance between the pair of longitudinally running ribs that delimits a portion of the bottom face of the support frame that contacts the wiping strip,
wherein the aerodynamic deflector is detachably connected to the support frame.

* * * * *